(12) United States Patent
Bennett

(10) Patent No.: US 6,843,075 B2
(45) Date of Patent: Jan. 18, 2005

(54) METHOD FOR CONTROLLING PROCESS VARIABLES AND AN OPTICAL TEMPERATURE SENSOR ASSEMBLY

(75) Inventor: James Bennett, McClure, OH (US)

(73) Assignee: Johns Manville International, Inc., Denver, CO (US)

(*) Notice: Subject to any disclaimer, the term of this patent is extended or adjusted under 35 U.S.C. 154(b) by 458 days.

(21) Appl. No.: 10/128,082

(22) Filed: Apr. 23, 2002

(65) Prior Publication Data

US 2003/0196458 A1 Oct. 23, 2003

(51) Int. Cl.7 .......................... C03B 37/04; C03B 37/07
(52) U.S. Cl. .............................. 65/378; 65/384; 65/470; 65/459; 65/460; 65/461; 65/485; 65/488; 65/521; 65/522; 65/523
(58) Field of Search ......................... 65/378, 384, 470, 65/459, 460, 461, 485, 488, 521, 522, 523

(56) References Cited

U.S. PATENT DOCUMENTS

| | | | | | |
|---|---|---|---|---|---|
| 4,259,866 A | * | 4/1981 | Sleighter | ..................... | 374/125 |
| 4,303,435 A | * | 12/1981 | Sleighter | .................. | 65/29.18 |
| 4,392,879 A | * | 7/1983 | Takeuchi et al. | ............... | 65/384 |
| 4,718,930 A | * | 1/1988 | Gartner et al. | ................. | 65/384 |
| 5,554,324 A | * | 9/1996 | Bernard et al. | ................. | 264/8 |

OTHER PUBLICATIONS

Merriam Webster's Collegiate Dictionary, 10th ed. 1997, pp. 562 and 1066; definitions for "house" and "sensor".*

* cited by examiner

Primary Examiner—John Hoffmann
(74) Attorney, Agent, or Firm—Robert D. Touslee

(57) ABSTRACT

A method of controlling process variables, for a fiberizing assembly including a rotary fiberizing disk in the manufacture of fibers from a high temperature, molten, clear or translucent, thermoplastic, fiberizable material, utilizes an optical sensor assembly. The optical sensor assembly includes a water-cooled optical fiber sensor probe which, in effect, only gathers light emitted from the external sidewall surface of the rotary fiberizing disk. The light is conducted from the probe to an electronic unit that converts the light energy into a temperature value. This temperature value is used to monitor the process and to make any changes in process variables, such as but not limited to heat input to the fiberizing disk, rate of rotation of the fiberizing disk, burner air/fuel ratio, required to produce fibers having desired fiber properties.

12 Claims, 2 Drawing Sheets

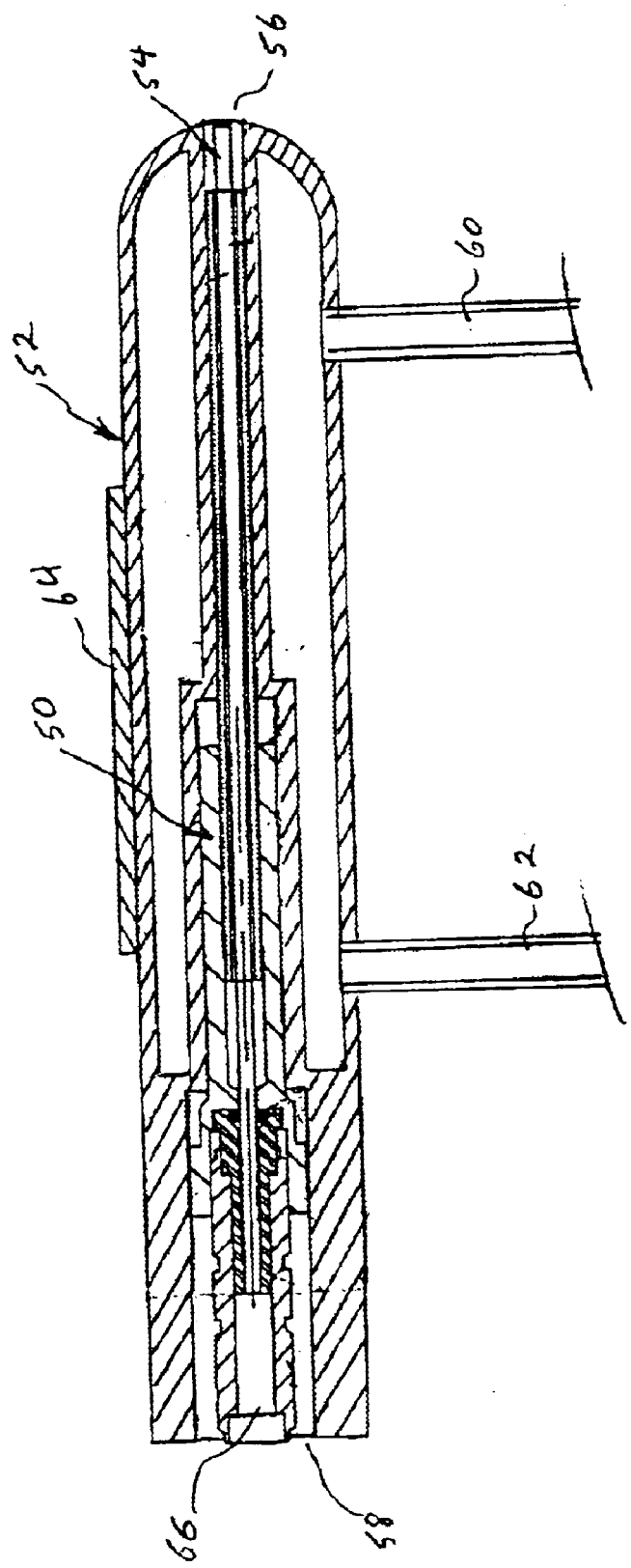
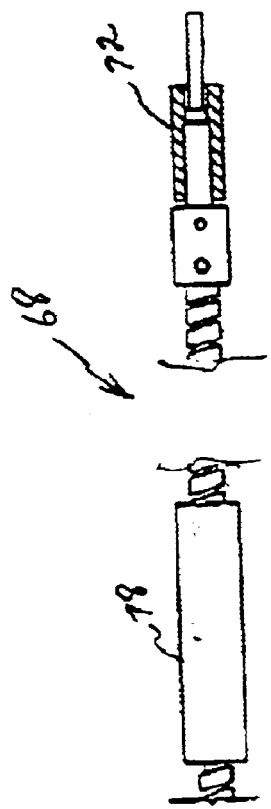
FIG. 2
FIG. 3

US 6,843,075 B2

METHOD FOR CONTROLLING PROCESS VARIABLES AND AN OPTICAL TEMPERATURE SENSOR ASSEMBLY

BACKGROUND OF THE INVENTION

The present invention relates to a method of controlling process variables in a fiberizing process and, in particular, to a method of controlling process variables in a rotary fiberizing process by monitoring the temperature of an external sidewall surface of a rotary fiberizing disk and an optical sensor assembly for monitoring the temperature of the external sidewall surface of the rotary fiberizing disk.

In the manufacture of fibers from high temperature, molten, clear or translucent, thermoplastic fiberizable materials, such as but not limited to the manufacture of glass fibers, it is normally desirable to produce fibers having selected physical characteristics, such as but not limited to a selected mean fiber diameter and/or a selected average fiber length, best suited for a particular application. For example, for reasons of manufacturing costs and required performance characteristics, the desired mean fiber diameter and/or average fiber length for a filtration product will normally differ from the desired mean fiber diameter and/or average fiber length of a building materials insulation product.

When manufacturing such fibers from a particular high temperature, molten, clear or translucent, thermoplastic fiberizable material by a fiberizing process that utilizes a rotating fiberizing disk of a specific diameter with a band of thousands of fiberizing orifices of a specific diameter in a peripheral sidewall of the fiberizing disk, the physical characteristics of the fibers produced by the fiberizing process can be changed by changing various process variables, such as but not limited to: the heating of the molten fiberizable material within the fiberizing disk to change the viscosity of the molten fiberizable material; the heating of the peripheral sidewall of the fiberizing disk to help maintain the molten fiberizable material at a preferred temperature and viscosity as the molten fiberizable material is being extruded through the fiberizing orifices in the sidewall of the fiberizing disk to form the fibers; the rate of rotation of the fiberizing disk; the heat input and velocity of high temperature products of combustion from an annular burner external of the rotating fiberizing disk; and the volume and velocity of an annular curtain air emitted from an annular air ring external of the rotating fiberizing disk.

SUMMARY OF THE INVENTION

With respect to rotary fiberization processes for fiberizing high temperature, molten, clear or translucent, thermoplastic fiberizable materials, Applicant has determined that for a selected high temperature, molten, clear or translucent, thermoplastic fiberizable material that is fiberized by rotating a fiberizing disk of a selected diameter at a given rate of rotation to extrude the molten fiberizable material through fiberizing orifices of a selected diameter, the physical characteristics of the fibers produced, e.g. the mean fiber diameter and/or average fiber length within selected tolerances, can be related to the temperature of the external surface of the fiberizing disk sidewall. Thus, by first determining the desired temperature or temperature range for the external surface of the sidewall of such a fiberizing disk, required to produce fibers with certain physical characteristics from a selected molten fiberizable material at a certain rate of rotation, the production of fibers with the desired physical characteristics can be accomplished by monitoring the temperature of the external surface of the fiberizing disk sidewall and controlling selected process variables, such as the heating of the molten material within the fiberizing disk and/or the internal heating of the fiberizing disk sidewall, to maintain the external surface temperature of the fiberizing disk sidewall within the predetermined range. The optical fiber sensor assembly and method of the present invention enable a rotary fiberizing process of the type discussed above to be controlled by monitoring the temperature of the external surface of the fiberizing disk sidewall.

In the method of controlling process variables to produce fibers having selected physical characteristics of the present invention, the fiberizing assembly utilized to form the fibers includes: a fiberizing disk; a motor for rotating the fiberizing disk at selected speeds of thousands of revolutions per minute; a melter or furnace for introducing a high temperature, molten, clear or translucent, thermoplastic, fiberizable material into the fiberizing disk to be extruded through fiberizing orifices of the fiberizing disk; a burner for supplying heat to an interior of the fiberizing disk; an air ring external of the fiberizing disk for redirecting fibers issuing from the fiberizing disk downward for collection; an external burner for maintaining the ambient conditions external of the fiberizing disk within a selected temperature range; and an optical sensor assembly.

The fiberizing disk has an annular peripheral sidewall extending vertically upward from an outer peripheral edge of the disk base. This annular peripheral sidewall has an exterior surface with an upper annular edge and a lower annular edge and a portion of the annular peripheral sidewall has thousands of fiberizing orifices therein, in a band intermediate the upper and lower annular edges of the annular peripheral sidewall, through which the high temperature, molten, clear or translucent, thermoplastic, fiberizable material is extruded by centrifugal force to form fibers by rotating the fiberizing disk. The burner for heating an interior of the fiberizing disk, heats the molten fiberizable material within the fiberizing disk as well as the annular peripheral sidewall of the fiberizing disk. The annular air ring assembly is concentrically located with respect to the fiberizing disk and has annular outlet means for discharging an annular curtain of high velocity air downward externally of and adjacent to the exterior surface of the annular peripheral sidewall of the fiberizing disk to redirect fibers issuing from the fiberizing orifices in the annular peripheral sidewall of the fiberizing disk downward for collection. The burner for discharging an annular curtain of combustion gases downward intermediate the air ring assembly and the exterior surface of the annular peripheral sidewall of the fiberizing disk maintains the ambient conditions external of the fiberizing disk within a desired temperature range to facilitate the attenuation of the fibers issuing from the fiberizing orifices to a desired fiber diameter.

The optical sensor assembly may be used in the method of the present invention to both predetermine a temperature or temperature range for the exterior surface of the annular sidewall of the fiberizing disk to form fibers with desired physical characteristics and to monitor the temperature of the external surface of fiberizing disk sidewall during the production of fibers to determine when changes are required to the process variables to maintain the temperature of the external surface of the fiberizing disk sidewall within an acceptable range to produce fibers with the desired physical characteristics. The light emitted by different metal alloys or the emissivity of different metal alloys at the same temperatures varies in a know manner that has been documented.

Thus, for a fiberizing disk made from a selected metal alloy, the light emitted by the exterior surface of the fiberizing disk sidewall varies in a known manner with the temperature of the external surface of the sidewall and the temperature of the external surface of the sidewall can be determined by gathering the light emitted from the external surface of the fiberizing disk sidewall. Due to the clear or translucent nature of the molten fiberizable material and the fibers formed from the molten fiberizable material that issue from the orifices in the fiberizing disk sidewall, the light from the external surface of the fiberizing disk sidewall passes through the clear or translucent fibers to the optical sensor assembly where the light gathered by the optical sensor assembly can be used to determine the external temperature of the fiberizing disk sidewall.

The optical sensor assembly includes an optical fiber sensor and a water-cooled tubular jacket that houses the optical fiber sensor: to maintain the optical fiber sensor below a temperature at which the optical fiber sensor may become damaged due to high temperature ambient conditions; to protect the sensor from damage due to turbulent ambient conditions; and to shield the optical fiber sensor from glass fibers produced by the manufacturing process. The water cooled tubular jacket has a first open end directed toward the exterior surface of the annular peripheral sidewall of the fiberizing disk that is adjacent the annular curtain of high velocity air discharged from the air ring assembly and a second open end directed away from the exterior surface of the annular peripheral sidewall of the fiberizing disk. The optical fiber sensor has an optical fiber sensor probe at a first end of the optical fiber sensor with a tip of the optical fiber sensor probe directed toward the exterior surface of the annular peripheral sidewall of the fiberizing disk to, in effect, only gather light emitted from the exterior surface of the annular peripheral sidewall of the rotary fiberizing disk. Any light gathered by the optical fiber sensor assembly from any source other than the exterior surface of the annular peripheral sidewall of the fiberizing disk is so minimal that it has no material affect on the temperature value obtained by the gathering of light with the optical fiber sensor assembly. Light, in effect, is only gathered from the exterior surface of the fiberizing disk sidewall to assure that the temperature readings are not adversely affected by light emitted from other components of the fiberizing assembly made of different materials and most likely operating at different temperatures or the underside of the fiberizing disk which although typically made from the same alloy will normally be operating at a temperature different from that of the sidewall. The tip of the optical fiber sensor probe is recessed within the first end of the water cooled tubular jacket to shield the tip of the optical fiber sensor probe from turbulence and fibers issuing from the fiberizing orifices while permitting the optical sensor probe to gather light from the exterior surface of annular peripheral sidewall of the fiberizing disk. Since the temperature of that portion of the external surface of the sidewall of the fiberizing disk containing the fiberizing orifices is most critical monitoring the formation of fibers with the desired physical characteristics, in a preferred embodiment of the invention, the light is, in effect, only gathered from that portion of the external surface of the sidewall of the fiberizing disk containing the band of fiberizing orifices. Any light gathered by the optical fiber sensor assembly from any source other than that portion of the exterior surface of the annular peripheral sidewall of the fiberizing disk containing the band of fiberizing orifices is so minimal that it has no material affect on the temperature value obtained by the gathering of light with the optical fiber sensor assembly.

The optical fiber sensor probe has a coupling at a second end of the optical fiber sensor probe for coupling the optical fiber sensor probe to an optical fiber transmission cable which conducts light emitted from the exterior surface of the sidewall of the fiberizing disk and collected by the optical fiber sensor probe to an electronics unit that converts light energy into a digitized electrical signal that is converted into a temperature value. The temperature value obtained is utilized to adjust certain selected process variables to maintain the external surface of the fiberizing disk sidewall at a selected temperature or within a selected temperature range to thereby produce fibers having desired fiber properties or to adjust certain selected process variables to change the temperature of the external surface of the fiberizing disk sidewall to a different temperature or temperature range to thereby produce fibers having different desired fiber properties.

BRIEF DESCRIPTION OF THE DRAWINGS

FIG. 2 is a schematic vertical cross section, taken substantially along the longitudinal centerline of an optical sensor assembly of the present invention, on a larger scale of the scale of FIG. 1.

FIG. 3 is a schematic side view of an optical fiber transmission cable for connecting the optical sensor probe to an electronics unit that provides a temperature value.

DESCRIPTION OF THE PREFERRED EMBODIMENT

Figure 1:
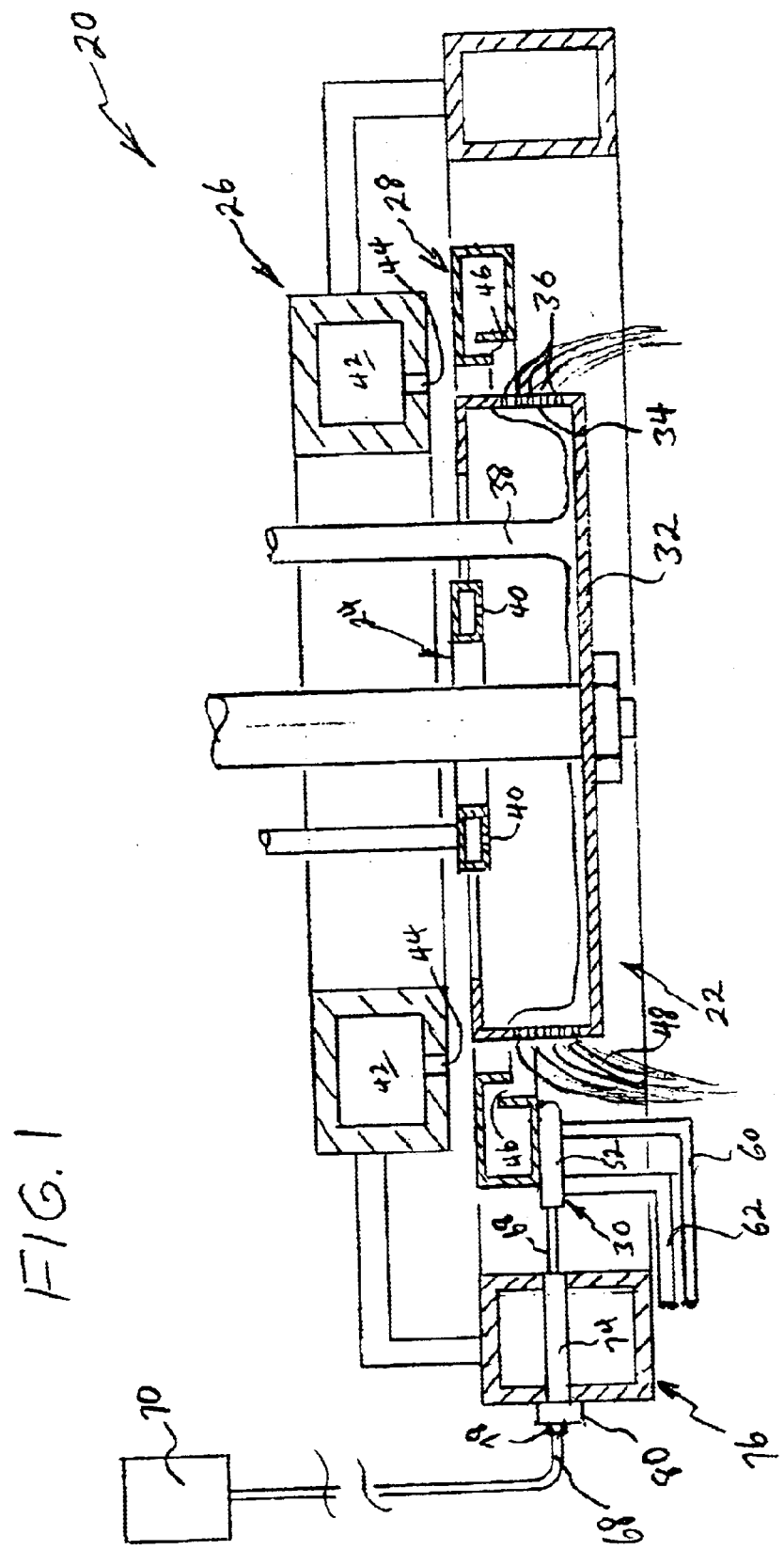
FIG. 1 is a schematic vertical cross section, taken substantially through the center of a fiberizing assembly that may be used in the method of the present invention.

Typically, the fiberizing assembly 20 of FIG. 1 is one of a series of fiberizing assemblies that are located in the upper portion of a collection chamber commonly used in the industry. The fiberizing assemblies are aligned over a foraminous collection conveyor (not shown) through which air is drawn to draw fibers produced by the fiberizing assemblies down onto the conveyor to form a blanket of randomly oriented entangled fibers. The fiberizing assembly 20 of the present invention includes: a fiberizing disk 22; a motor (not shown) for rotating the fiberizing disk at selected speeds of thousands of revolutions per minute (e.g. two to three thousand revolutions per minute); a melter or furnace (not shown) from which a high temperature, molten, clear or translucent, thermoplastic, fiberizable material (e.g. glass at about 1800 to 2100° F.) is poured or otherwise introduced into the interior of the fiberizing disk; a burner 24 for supplying heat to molten fiberizable material within the fiberizing disk and for heating the sidewall of the fiberizing disk; an external burner 26 for maintaining the ambient conditions, external of the fiberizing disk, within a selected temperature range for fiber attenuation; an air ring 28 external of the fiberizing disk that discharges a high velocity curtain of air to redirect fibers issuing from the fiberizing disk downward for collection; and an optical sensor assembly 30.

The fiberizing disk 20 includes a disk shaped base 32 and an annular peripheral sidewall 34 that extends upward from a peripheral edge of the base 32. The annular peripheral sidewall 34 has an upper annular edge and a lower annular edge and a portion of the annular peripheral sidewall 34 contains thousands of small diameter fiberizing orifices 36 (e.g. orifices about 0.022 to about 0.025 inches in diameter) that are arranged in an annular band intermediate the upper and lower edges of the annular peripheral sidewall 34. The fiberizing disk is made of a high temperature resistant alloy (e.g. a high strength, corrosion resistant, cobalt alloy). An electric motor drives or rotates the fiberizing disk through a conventional drive train with the electric motor and drive train being capable of rotating the fiberizing disk at selected speeds, e.g. selected speeds between two and three thousand revolutions per minute. The high temperature, molten, clear or translucent, thermoplastic, fiberizable material is poured in a stream 38 from a melter or furnace into the interior of the fiberizing disk. While other high temperature, molten, clear or translucent, thermoplastic fiberizable materials can be fiberized with the apparatus and by the method of the present invention, preferably, the high temperature, molten, clear or translucent, thermoplastic fiberizable material fiberized with the apparatus and method of the present invention is glass, e.g. glass at temperature of about 1800° F. to 2100° F.

Preferably, the burner 24 for heating the molten fiberizable material within the fiberizing disk 22 and the annular peripheral sidewall 34 of the fiberizing disk 22 is an annular burner with an annular slot 40 for discharging a combustible gaseous mixture, e.g. a natural gas/air mixture downward into the interior of the fiberizing disk 22. The combustible gaseous mixture burns within the fiberizing disk 22 to control the temperature of the molten fiberizable material being fed to the fiberizing orifices 36 in the annular peripheral sidewall of the fiberizing disk. The combustible gaseous mixture can be made fuel rich, e.g. natural gas rich, so that there is insufficient oxygen in the mixture to burn all of the fuel within the fiberizing disk 22. This unburnt fuel spills out over the upper edge of and down the sidewall of the fiberizing disk 22 where oxygen is available to enable the combustion of the previously unburnt fuel. The combustion of the previously unburnt fuel along the exterior surface of the annular peripheral sidewall 34 heats the annular peripheral sidewall of the fiberizing disk.

The external burner 26 of the fiberizing assembly 20 has a combustion chamber 42 where a fuel (e.g. natural gas) and air mixture, introduced into the burner 26 is burned. The hot gaseous products of combustion or combustion gases exit the external burner 26 through an annular slot or an annular array of outlet ports 44 to form a downwardly directed curtain of hot combustion gases.

The annular air ring 28 directs an annular curtain of high velocity air downward externally of and adjacent the external surface of the fiberizing disk sidewall 34. The high velocity flow of air from the annular outlet slot 46 on the inner side of the annular air ring 28 inspirates or draws air in through the annular gap between the lower surface of the external burner 26 and the upper surface of the air ring 28. This flow of air, together with the hot combustion gases exiting from the external burner 26, creates a hot, high velocity, curtain of heated air and combustion gases that passes downward along and adjacent the external surface of the sidewall 34 of the rotating fiberizing disk. This curtain of hot, high velocity air and combustion gases intersects the primary fibers 48 exiting the fiberizing orifices 36 at a sharp angle (typically an angle of about ninety degrees) to the longitudinal axes of the primary fibers 48 to attenuate the primary fibers to their final diameter and length and redirects the fibers downward for collection.

The optical sensor assembly 30 includes an optical fiber sensor 50 and a water-cooled tubular jacket 52 that houses the optical fiber sensor 50 to maintain the optical fiber sensor 50 below a temperature at which components of the optical fiber sensor (e.g. resins holding certain components of the sensor together) may melt or become damaged due to high temperature ambient conditions, to protect an optical fiber sensor probe 54 of the optical fiber sensor 50 from damage due to turbulent ambient conditions, and to shield the optical fiber sensor probe 54 from glass fibers. A preferred optical fiber sensor 50 utilized in the present invention includes a fiber or rod of single crystal sapphire as the optical fiber sensor probe 54 that gathers light from the external sidewall surface 34 of the fiberizing disk 22. This fiber or rod single crystal sapphire probe 54 is brittle and if the sapphire probe 54 were not sheltered from the turbulent ambient conditions adjacent the fiberizing disk and the air ring assembly by the water-cooled jacket 52, the sapphire probe 54 could be easily broken off or otherwise damaged in service. The water-cooled tubular jacket 52 has a first open end 56 directed toward the exterior surface of the annular peripheral sidewall 34 of the fiberizing disk that is adjacent the annular curtain of high velocity air discharged from the air ring assembly 28 and a second open end 58 directed away from the exterior surface of the annular peripheral sidewall of the fiberizing disk. Water is introduced into the water-cooled tubular jacket 52 through an inlet pipe 60 and is discharged from the water-cooled tubular jacket through an outlet pipe 62. A plate 64 welded or otherwise secured to the upper surface of the water-cooled tubular jacket 52 may be bolted or welded to the underside of the air ring assembly 30 to secure the water-cooled tubular jacket in place opposite the exterior surface of the sidewall 34 of the fiberizing disk 22 and directed radially inward toward the center of rotation of the fiberizing disk 22.

The optical fiber sensor probe 54, preferably a sapphire probe, of the optical fiber sensor 50 is located at a first end of the optical fiber sensor 50 with a tip of the optical fiber sensor probe 54 opposite and directed toward the exterior surface of the annular peripheral sidewall 34 of the fiberizing disk 22 and the center of rotation of the fiberizing disk 22 to, in effect, only gather light emitted from the exterior surface of the annular peripheral sidewall 34 of the rotating fiberizing disk 22 and to, preferably, in effect, only gather light emitted from that portion of the exterior surface of the annular peripheral sidewall 34 of the fiberizing disk 22 containing the annular band of fiberizing orifices 36. Light is only gathered from the exterior surface of the fiberizing disk sidewall 34 and, preferably, only from that portion of the exterior surface of the fiberizing disk sidewall 34 containing the band of fiberizing orifices, to assure that the temperature readings obtained by the optical fiber sensor 50 are not adversely affected by light emitted from other components of the fiberizing assembly 20 made of different materials and most likely operating at different temperatures or the underside of the fiberizing disk 22 which although typically made from the same alloy as the sidewall of the fiberizing disk will normally be operating at a temperature different from that of the sidewall. While the tip of the optical fiber probe 54 is recessed within the first end 56 of the water cooled tubular jacket to shield the tip of the optical fiber sensor probe 54 from turbulence and from fibers 48 issuing from the fiberizing orifices 36 of the fiberizing disk 22, the diameter of the opening in the first end 56 of the water-cooled tubular jacket 52 and the degree to which the tip of the optical fiber sensor probe 54 is recessed within the jacket permit the optical sensor probe to gather light from the entire height of the exterior surface of annular peripheral sidewall 34 of the fiberizing disk or from that portion of the exterior surface of the annular peripheral sidewall 34 containing the band of fiberizing orifices 36. Gathering light, in effect, only from that portion of the exterior sidewall 34 of the fiberizing disk 22 containing the band of fiberizing orifices is preferred since the temperature of that portion of the external surface of the sidewall 34 of the fiberizing disk 22 containing the band of fiberizing orifices 36 is most critical to the formation of fibers with the desired physical characteristics.

The optical fiber sensor 50 has a coupling 66 at a second end of the optical fiber sensor for coupling the optical fiber sensor to an optical fiber transmission cable 68 which conducts light emitted from the exterior surface of the sidewall 34 of the fiberizing disk 22 and collected by the optical fiber sensor probe 54 to an electronics unit 70. The optical fiber transmission cable 68 has a coupling 72 that is received within the coupling 66 of the optical fiber sensor 50 and passes through a tube 74 in a fuel/air supply manifold 76 for the external burner 26. Preferably, the optical fiber transmission cable 68 is provided with a sleeve 78 that is secured to the cable. A compression fitting 80 on the outside of the fuel/air supply manifold can be tightened about the sleeve to hold the cable 68 and the optical fiber sensor 50 in place or the compression fitting 80 can be loosened: to permit the cable 68 and the optical fiber sensor 50 to be moved axially relative to the tube 74 and the water-cooled tubular jacket 52 to adjust the degree to which the tip the of fiber optic probe 54 is recessed within the opening at the first end 56 of the water-cooled tubular jacket 52; to permit the optical fiber sensor 50 to be removed from the water-cooled tubular jacket 52; or to permit the optical fiber sensor 50 to be placed into the water-cooled tubular jacket 52.

The electronics unit 70 converts light energy into a digitized electrical signal that in turn is converted into a temperature value. A preferred optical fiber sensor 50, optical fiber transmission cable 68 and electronics unit 70 for use in the method and the fiberizing assembly of the present invention is an optical fiber thermometer marketed by Luxtron Corporation of Santa Clara, Calif. under the trade designation "Luxtron Accufiber Model 100". This optical fiber thermometer utilizes a fiber or rod of single crystal sapphire with a quartz sheath to gather light from the target that in this case is the exterior sidewall or a portion of the exterior sidewall of the fiberizing disk 22 and a high ambient optical fiber transmission cable with an armor and transmission cable vacuum/pressure sleeve. As will be discussed in more detail below, the temperature value obtained is utilized to adjust process variables to maintain the external surface of the fiberizing disk sidewall within a selected temperature range and thereby obtain fibers having desired fiber properties.

In the method of the present invention, a stream 38 of high temperature, molten, clear or translucent, thermoplastic fiberizable material, preferably glass at a temperature ranging from about 1800° F. to about 2100° F., is introduced into the interior of the rotating fiberizing disk 22 where the molten fiberizable material flows, due to centrifugal forces, across the base 32 and up the inner surface of the annular peripheral sidewall 34 of the fiberizing disk 22. The molten fiberizable material flowing across the base 32 and up the inner surface of the annular peripheral sidewall 34 of the fiberizing disk 22 is heated by the combustion or partial combustion of the fuel/air mixture emitted by the burner 24 to maintain or adjust the temperature of the molten fiberizable material and control the viscosity of the molten fiberizable material being extruded through the fiberizing orifices 36. Where a fuel rich mixture of fuel/air is emitted into the fiberizing disk, unburnt fuel, e.g. unburnt natural gas, flowing out over the upper edge of the fiberizing disk and down along the exterior surface of the annular peripheral sidewall of the fiberizing disk combusts to heat the sidewall of the fiberizing disk. The molten fiberizable material flowing out through the fiberizing orifices 36 in the fiberizing disk sidewall form primary fibers 48. These primary fibers 48 exit the fiberizing orifices in a generally horizontal direction and are introduced into the hot, high velocity, annular curtain of heated air and combustion gases passing downward along and adjacent the exterior surface of the fiberizing disk sidewall 34. The hot, high velocity, annular curtain of heated air and combustion gases impinge upon the primary fibers at a sharp angle, an angle of about 90°, to attenuate the fibers and redirect the fibers downward for collection.

As the molten fiberizable material is being formed into fibers, the optical fiber sensor probe 54 of the optical fiber sensor 50 gathers light, in effect, only from the exterior surface of the annular peripheral sidewall 34 of the fiberizing disk 22 or preferably, in effect, only from that portion of the exterior surface of the annular peripheral sidewall 34 of the fiberizing disk 22 containing the band of fiberizing orifices 36. The light energy gathered by the optical fiber sensor probe 54 is converted into a temperature reading by the electronics unit 70 and thus, the operator can monitor the temperature of the external surface of the annular peripheral sidewall 34 or the portion thereof containing the fiberizing orifices 36. When glass is being fiberized the temperature of the external surface of the annular peripheral sidewall 34 of the fiberizing disk 22 is typically between about 1500° F. and 2000° F. When fiberizing a selected high temperature, molten, clear or translucent, thermoplastic, fiberizable material, such as glass, with a fiberizing disk of a certain diameter having fiberizing orifices of a selected diameter that is rotated at a selected rate of rotation, fibers are formed from the molten fiberizable material at that selected rate of rotation that differ in physical characteristics, e.g. mean fiber diameter and/or average fiber length, at different temperatures of the external surface of the annular peripheral sidewall 34 of the fiberizing disk or that portion of the external surface of the annular peripheral sidewall 34 containing the band of fiberizing orifices 36. Thus by monitoring the temperature of the external surface of the annular peripheral sidewall 34 or that portion of the annular peripheral sidewall 34 containing the band of fiberizing orifices 36, the operating parameters of the process can be changed, e.g. the fuel/air ratio in the internal burner 24, to change the temperature of the external surface of annular peripheral sidewall 34 or that portion of the annular peripheral sidewall 34 of the fiberizing disk 22 containing the band of fiberizing orifices 36 to change the physical characteristics of the fibers formed by the fiberizing disk or the operating parameters can be controlled or adjusted as needed to maintain desired fiber characteristics by keeping the temperature of the external surface of annular peripheral sidewall 34 or that portion of the annular peripheral sidewall 34 of the fiberizing disk 22 containing the band of fiberizing orifices 36 constant or within a limited temperature range.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A fiberizing assembly for forming fibers, comprising: a fiberizing disk, the fiberizing disk having a disk shaped base and an annular peripheral sidewall extending vertically upward from an outer peripheral edge of the base; the annular peripheral sidewall having an exterior surface with an upper annular edge and a lower annular edge; a portion of the annular peripheral sidewall having thousands of fiberizing orifices therein, in a band intermediate the upper and lower annular edges of the annular peripheral sidewall, through which high temperature, molten, thermoplastic, clear or translucent fiberizable material is extruded by centrifugal force to form fibers by rotating the fiberizing disk;

means for rotating the fiberizing disk at speeds of thousands of revolutions per minute;

means for introducing molten fiberizable material into the fiberizing disk to be extruded through the fiberizing orifices in the annular peripheral sidewall of the fiberizing disk to form fibers;

an annular air ring assembly concentrically located with respect to the fiberizing disk; the annular air ring assembly having annular outlet means for discharging an annular curtain of high velocity air downward externally of and adjacent to the exterior surface of the annular peripheral sidewall of the fiberizing disk to direct glass fibers issuing from the fiberizing orifices in the annular peripheral sidewall of the fiberizing disk downward for collection;

an optical sensor assembly for monitoring fiberizing disk temperature; the optical sensor assembly including an optical sensor and a water cooled tubular jacket housing the optical sensor to maintain the optical sensor below a temperature at which the optical sensor may become damaged due to high temperature ambient conditions; the water cooled tubular jacket being located at the underside of the annular air ring assembly; the water cooled tubular jacket having a first open end directed toward the exterior surface of the annular peripheral sidewall of the fiberizing disk that is adjacent the annular curtain of high velocity air discharged from the air ring assembly and a second open end directed away from the exterior surface of the annular peripheral sidewall of the fiberizing disk; the optical sensor having an optical fiber sensor probe at a first end of the optical sensor with a tip of the optical fiber sensor probe directed toward the exterior surface of the annular peripheral sidewall of the fiberizing disk to in effect only gather light emitted from the exterior surface of the annular peripheral sidewall of the rotary fiberizing disk; the tip of the optical fiber sensor probe being recessed within the first end of the water cooled tubular jacket to shield the tip of the optical fiber sensor probe from clear or translucent fibers issuing from the fiberizing orifices while permitting the optical sensor probe to gather light from the exterior surface of annular peripheral sidewall of the fiberizing disk; the optical fiber sensor probe having a coupling at a second end of the optical fiber sensor probe for coupling the optical fiber sensor probe to an optical fiber transmission cable which conducts light emitted from the exterior surface of the sidewall of the fiberizing disk and collected by the optical fiber sensor probe to an electronics unit that converts light energy into a digitized electrical signal that is converted into a temperature value.

2. The fiberizing assembly for forming fibers according to claim 1, wherein:
the optical sensor probe in effect only gathers light from the portion of the exterior peripheral sidewall of the fiberizing disk containing the band of fiberizing orifices.

3. The fiberizing assembly for forming fibers according to claim 2, wherein:
the tip of the optical fiber sensor probe lays in a horizontal plane intermediate the upper and lower annular edges of the exterior surface of the annular peripheral sidewall of the fiberizing disk.

4. The fiberizing assembly for forming fibers according to claim 2, wherein:
the tip of the optical fiber sensor probe lies in a horizontal plane intermediate upper and lower annular edges of the band of fiberizing orifices.

5. The fiberizing assembly for forming fibers according to claim 1, wherein:
the optical fiber sensor probe is a rod of single crystal sapphire.

6. A method of controlling process variables in a fiberizing assembly for forming fibers wherein the fiberizing assembly includes: a fiberizing disk, the fiberizing disk having a disk shaped base and an annular peripheral sidewall extending vertically upward from an outer peripheral edge of the base; the annular peripheral sidewall having an exterior surface with an upper annular edge and a lower annular edge; a portion of the annular peripheral sidewall having thousands of fiberizing orifices therein, in a band intermediate the upper and lower annular edges of the annular peripheral sidewall, through which high temperature, molten, clear or translucent, thermoplastic, fiberizable material is extruded by centrifugal force to form fibers by rotating the fiberizing disk; means for rotating the fiberizing disk at speeds of thousands of revolutions per minute and for varying the speed of rotation; means for introducing molten fiberizable material into the fiberizing disk to be extruded through the fiberizing orifices in the annular peripheral sidewall of the fiberizing disk; means for heating an interior of the fiberizing disk and molten fiberizable material within the fiberizing disk; an annular air ring assembly concentrically located with respect to the fiberizing disk; the annular air ring assembly having annular outlet means for discharging an annular curtain of high velocity air downward externally of and adjacent to the exterior surface of the annular peripheral sidewall of the fiberizing disk to direct fibers issuing from the fiberizing orifices in the annular peripheral sidewall of the fiberizing disk downward for collection; and a burner means for discharging an annular curtain of combustion gases downward intermediate the air ring assembly and the exterior surface of the annular peripheral sidewall of the fiberizing disk; the method comprising:

utilizing an optical sensor assembly to monitor fiberizing disk temperature; the optical sensor assembly including an optical sensor and a water cooled tubular jacket housing the optical sensor to maintain the optical sensor below a temperature at which the optical sensor may become damaged due to high temperature ambient conditions and to protect the sensor from damage due to turbulent ambient conditions; locating the water cooled tubular jacket with the water cooled tubular jacket having a first open end directed toward the exterior surface of the annular peripheral sidewall of the fiberizing disk and adjacent the annular curtain of high velocity air discharged from the air ring assembly and a second open end directed away from the exterior surface of the annular peripheral sidewall of the fiberizing disk; the optical sensor having an optical fiber sensor probe at a first end of the optical sensor with a tip of the optical fiber sensor probe directed toward the exterior surface of the annular peripheral sidewall of the fiberizing disk to in effect only gather light emitted from the exterior surface of the annular peripheral sidewall of the rotary fiberizing disk; the tip of the optical fiber sensor probe being recessed within the first end of the water cooled tubular jacket to shield the tip of the optical fiber sensor probe from fibers issuing from the fiberizing orifices while permitting the optical sensor probe to gather light from the exterior surface of annular peripheral sidewall of the fiberizing disk; the optical fiber sensor probe having a coupling at a second end of the optical fiber sensor probe for coupling the optical fiber sensor probe to an optical fiber transmission cable which conducts light emitted from the exterior surface of the sidewall of the fiberizing disk and collected by the optical fiber sensor probe to an electronics unit that converts light energy into a digitized electrical signal that is converted into a temperature value; and utilizing the temperature value to adjust process variables to obtain fibers having desired fiber properties.

7. The method of controlling process variables in a fiberizing assembly for forming fibers according to claim 6, wherein:

the optical sensor probe in effect only gathers light from the portion of the exterior peripheral sidewall of the fiberizing disk containing the band of fiberizing orifices.

8. The method of controlling process variables in a fiberizing assembly for forming fibers according to claim 7, including:

locating the tip of the optical fiber sensor probe in a horizontal plane intermediate the upper and lower annular edges of the exterior surface of the annular peripheral sidewall of the fiberizing disk.

9. The method of controlling process variables in a fiberizing assembly for forming fibers according to claim 8, wherein:

the high temperature, molten, clear or translucent, thermoplastic, fiberizable material is glass.

10. The method of controlling process variables in a fiberizing assembly for forming fibers according to claim 7, wherein:

locating the tip of the optical fiber sensor probe in a horizontal plane intermediate upper and lower annular edges of the band of fiberizing orifices.

11. The method of controlling process variables in a fiberizing assembly for forming fibers according to claim 6, wherein:

the optical fiber sensor probe is a rod of single crystal sapphire.

12. The method of controlling process variables in a fiberizing assembly for forming fibers according to claim 6, wherein:

the high temperature, molten, clear or translucent, thermoplastic, fiberizable material is glass.

* * * * *